United States Patent [19]

Kageyama et al.

[11] Patent Number: 5,214,311
[45] Date of Patent: May 25, 1993

[54] POWER SUPPLY DEVICE

[75] Inventors: Hironobu Kageyama; Mitsuo Nakamura, both of Kawasaki, Japan

[73] Assignee: Fujitsu Limited, Kanagawa, Japan

[21] Appl. No.: 730,725

[22] Filed: Jul. 16, 1991

[30] Foreign Application Priority Data

Jul. 16, 1990 [JP] Japan .................. 2-187528

[51] Int. Cl.$^5$ .............................. H02J 3/00
[52] U.S. Cl. ..................... 307/18; 307/42; 307/43; 307/64
[58] Field of Search ........... 307/11, 18, 42, 43, 307/64, 85

[56] References Cited

U.S. PATENT DOCUMENTS 4,051,384  9/1977  Ansorge ................. 307/18
4,670,661  6/1987  Ishikawa ................ 307/66
4,672,226  6/1987  Sutherland ............. 307/43

Primary Examiner—Jeffrey A. Gaffin
Attorney, Agent, or Firm—Nikaido, Marmelstein, Murray & Oram

[57] ABSTRACT

A power supply device includes an emergency power cut-off switch, a basic power supply unit supplied with an external alternating current electric power through the emergency power cut-off switch and a plurality of expansion power supply units supplied respectively with external alternating current electric power through power supply switches and provided sequentially and externally to the basic power supply unit. Diodes or current control elements are inserted in a path connecting a first line supplied with direct current outputs from the power supply units in the preceding stages of the externally provided expansion power supply units to a second line for supplying direct current outputs to the power supply units in the next stages of the externally provided expansion power supply units.

9 Claims, 11 Drawing Sheets

POWER SUPPLY DEVICE

FIELD OF THE INVENTION

This invention pertains to a power supply device in which expansion power supply units are sequentially and additionally provided externally to the basic power supply unit without limitation, and in particular to a power supply device suitable for a computer system, in which respective expansion power supply units externally provided are controlled to stop operating sequentially when an emergency power supply cut-off switch of the basic power supply unit opens, and in which only a discretional expansion power supply unit is controlled to stop operating when the basic power supply unit operates.

BACKGROUND OF THE INVENTION

Computer systems are usually configured to have their expansion units with respective power supply units sequentially and additionally provided externally to the basic units.

Therefore, when the power supply to system CPUs connected to the basic power supply is severed due to an emergency, it is necessary to cut off power supply units for all the expansion units in association with the basic power supply units.

A power supply device as shown in FIG. 1 has been proposed. A basic power supply unit 12-0 is supplied with an alternating current electric power through a circuit breaker (emergency power supply cut-off switch) 10-0 and a filter 28-0.

The expansion power supply units 12-1 through 12-$n$ are sequentially and additionally provided externally to the basic power supply unit 12-0 and are supplied with alternating current electric power respectively via filters 28-1 through 28-$n$ and mainline switch circuit breakers 10-1 through 10-$n$ (power supply switches).

The direct current outputs from main power supply circuits 14-0 and 14-1 through 14-$n$ are supplied respectively to the basic unit and expansion units of the system 29-0 through 29-$n$ comprising CPUs.

The above basic power supply unit 12-0 and the expansion power supply units 12-1 through 12-$n$ are equipped with the main electric power circuits 14-0 and 14-1 through 14-$n$ as well as internal power supply circuits 16-0 and 16-1 through 16-$n$, and are respectively configured to convert alternating current electric power externally supplied via the circuit breaker (emergency power supply cut-off switch) 10-0 and the circuit breakers (power supply switches) 10-1 through 10-$n$ into direct currents.

Furthermore, the internal power supply circuits 16-0 and 16-1 through 16-$n$ are respectively provided with relay coils 18-0 and 18-1 through 18-$n$, which are magnetically excited upon receipt of control signals from external controllers 31-0 through 31-$n$ after the internal power supply circuits 16-0 and 16-1 through 16-$n$ receive external alternating current electric power. The control circuits 31-0 through 31-$n$ are connected to consoles 32-0 through 32-$n$.

In addition, relay contacts 20-0 and 20-1 through 20-$n$ are respectively provided at the alternating current power input terminals of the main power supply circuits 14-0 and 14-1 through 14-$n$ and are driven to close respectively by the magnetic excitations of the relay coils 18-0 and 18-1 through 18-$n$.

Here, the external alternating current electric power input to the basic electric power unit 12-0 is supplied also to the internal power supply circuits 16-1 through 16-$n$ of the expansion power supply units 12-1 through 12-$n$.

Hence, when the circuit breaker 10-0 is opened, the relay coils 18-0 and 18-1 through 18-$n$ of the internal power supply circuits 16-0 and 16-1 through 16-$n$ are cleared of magnetic excitations, and the relay contacts 20-0 and 20-1 through 20-$n$ are opened.

Accordingly, the external alternating current electric power supplies to the main power supply circuits 14-0 and 14-1 through 14-$n$ are cut off and their operations are controlled to stop all at once.

Although separate and independent external alternate power supplies are connected to the main power supplies of the basic power supply unit and the expansion power supply units in this configuration, since the external alternate electric power supplied to the basic power supply unit 12-0 is all shunted to the main power supply circuits 14-1 through 14-$n$ of the expansion power supply units 12-1 through 12-$n$ and the current capacity of the basic power supply cannot be increased infinitely. Thus, the number of the expansion power supply units 12-1 through 12-$n$ cannot be increased indefinitely.

To solve the above problem, a power supply device shown in FIG. 2 has also been proposed.

In the proposed device, pairs of emergency cut-off switch driving relay coils 22-1 through 22-$n$ and emergency cut-off relay contacts 24-1 through 24-$n$ are provided for the expansion power supply units 12-1 through 12-$n$.

The respective emergency cut-off switch driving relay coils 22-1 through 22-$n$ are magnetically excited by the internal power supply circuits 16-0 and 16-1 through 16-$n$-1 of the power supply units 12-0 and 12-1 through 12-$n$-1, which become the preceding stages of the additionally provided power supply units. The relay contacts 24-1 through 24-$n$ are respectively driven to close by the magnetic excitations.

Thus, when the power supply to the internal power supply circuit 16-0 of the basic power supply unit (12-0) is cut off, its output is turned off, the power supply to the emergency cut-off switch driving relay coil 22-1 in the expansion power supply unit of the next stage is turned off, and the emergency cut-off relay contact 24-1 in the expansion power supply unit 12-1 opens. Therefore, when the circuit breaker 10-0 is opened, the external alternating current electric power supplies to the main power supply circuits 14-0 and 14-1 through 14-$n$ are sequentially cut off.

The proposed device has its power supply load distributed over the present and succeeding stages additionally provided, because the power supply units 12-0 and 12-1 through 12-$n$ 1 output direct currents to the present and succeeding stages.

Thus, it becomes possible to externally provide expansion power supply units 12-1 through 12-$n$, with no limit, to the basic power supply unit 12-0.

The above proposed device does not allow maintenance or inspection for only the desired expansion power supply unit (i.e. system's expansion unit), because when any of the circuit breakers 10-0 and 10-1 through 10-$n$ are opened, all the power supply units in the stages after the one in which the circuit breaker is opened, are cut off.

SUMMARY OF THE INVENTION

This invention aims at realizing a device capable of externally providing expansion power supply units without any restriction and capable of stopping the electric power supplies to the desired expansion power supply unit, even when the basic power supply unit is energized.

A feature of the present invention resides in a device in which the basic power supply unit and the respective expansion power supply units contain a) internal power supply circuits and main power supply circuits for converting externally supplied alternating current electric power to direct current electric power and b) a switch driven by a switch driving circuit supplied with electricity from the internal power supply circuits switch on the external alternating current electric power to the main electric power supply circuit. The internal power supply circuits of the respective expansion power supply units are relay driven, by the direct current outputs supplied from the internal power supply units of the power supply units which become the preceding stages of the externally provided expansion power supply units, to receive external alternating current electric power. Lines for direct current outputs from the internal power supply circuits in the preceding stages of the externally provided units are connected to lines for the direct current outputs from the succeeding stages of the externally provided units. Diodes are inserted in the respective paths connecting both lines. Namely, the lines supplied with direct current outputs from the internal power supply units in the preceding stages of the power supply units are connected to the lines supplying direct current outputs to the emergency cut off relay coils in the succeeding stages of the externally provided power supply units through diodes respectively inserted in the paths connecting both lines.

Since this invention causes the power supply unit in the preceding stage or its preceding stage to supply direct current electric power to the emergency cut-off switch driving relay coil in the present stage, even if electric power for the expansion units in the preceding stages of the externally provided power supply units is cut off, the preceding stage or its preceding stage supplies power to the emergency cut-off switch driving relay coil of an arbitrarily chosen expansion power supply unit. Therefore, even if the expansion power supply unit in the preceding stage is turned off, since the preceding stage of the preceding stage supplies power to the present stage, the expansion power supply units in the succeeding stages also keep receiving the electric power supply.

DESCRIPTION OF THE PREFERRED EMBODIMENTS

Preferred embodiments of this invention are described below by referring to the attached drawings.

Figure 1:
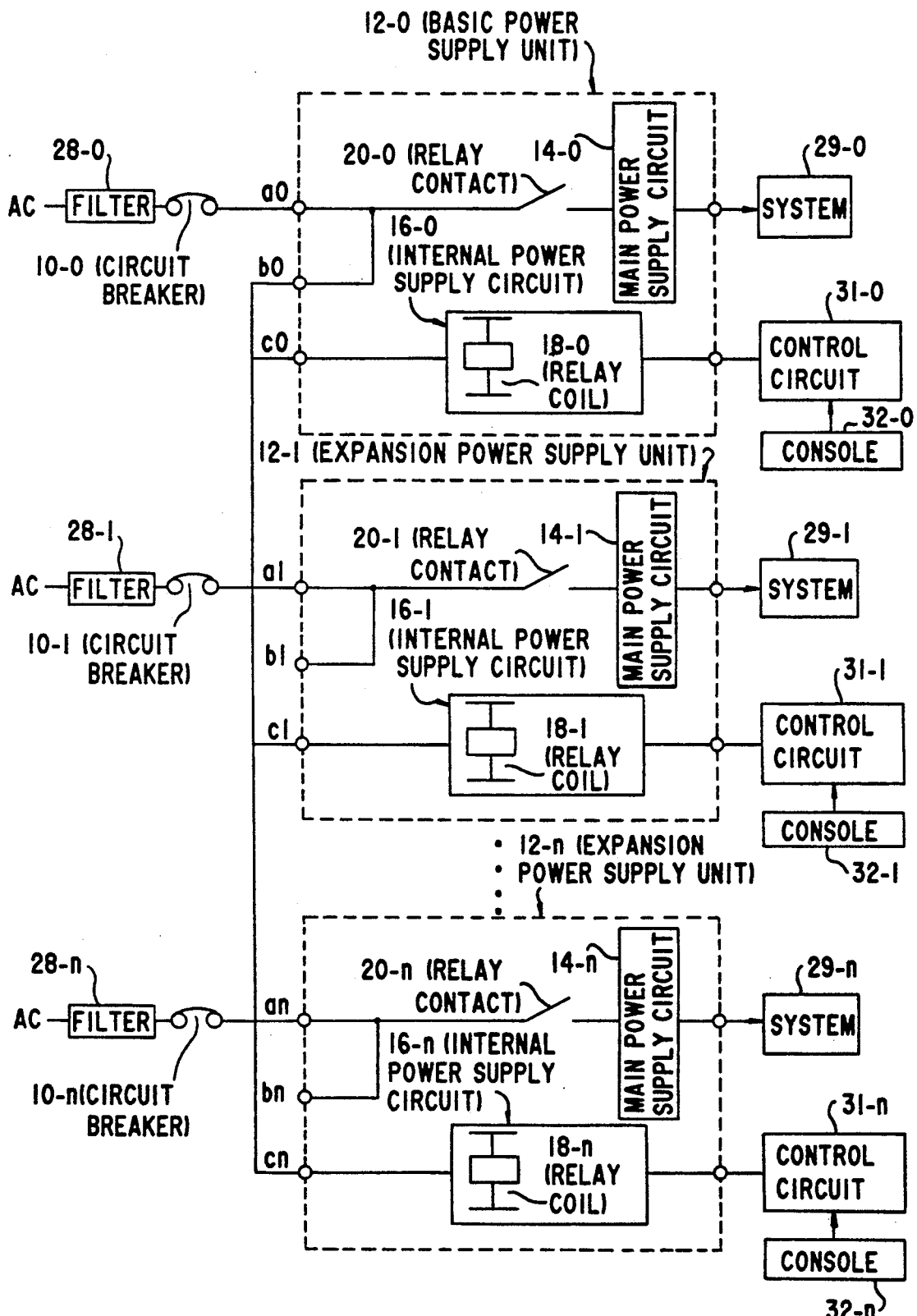
FIG. 1 shows the configuration of a proposed device.
Figure 2:
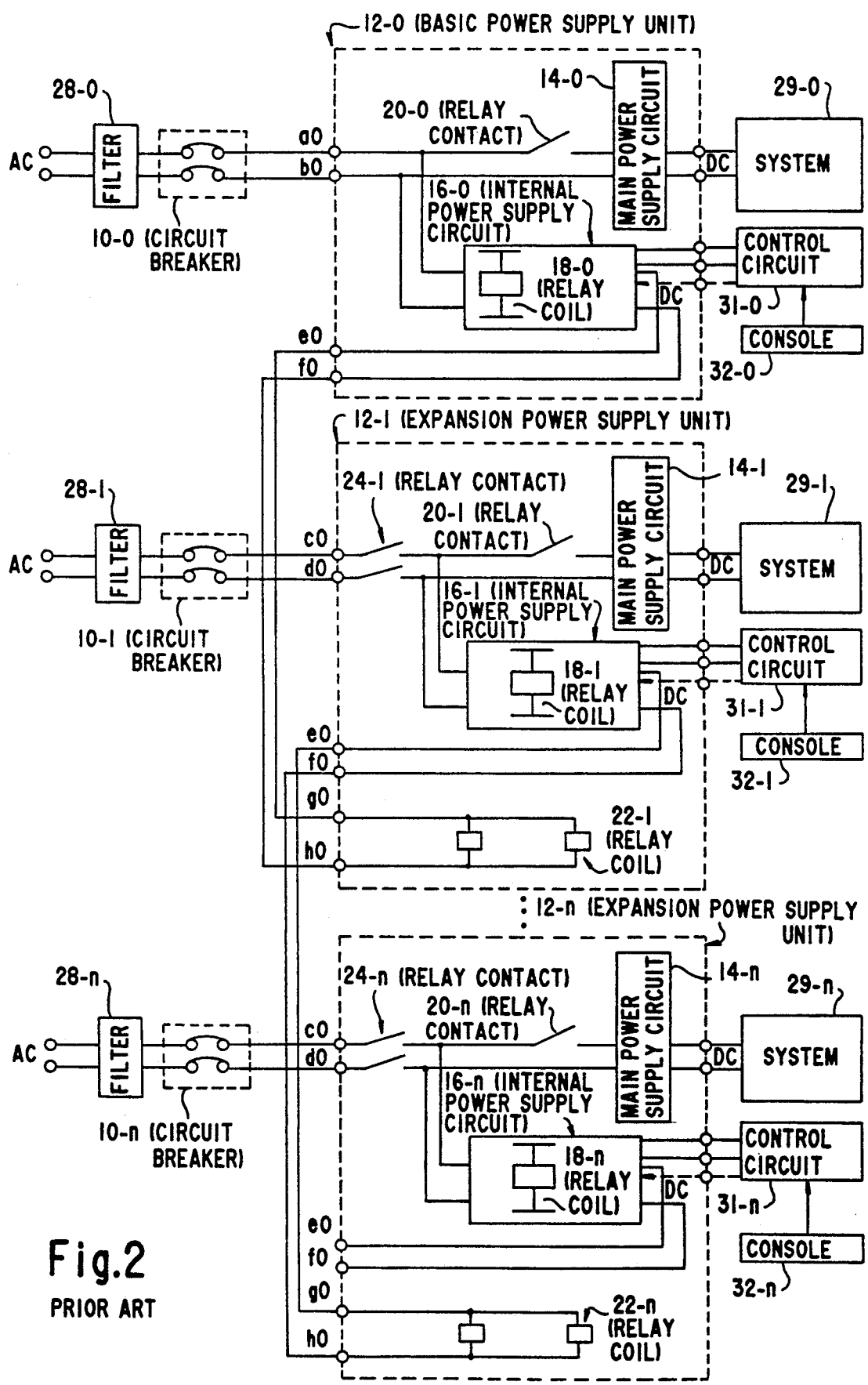
FIG. 2 shows the configuration of a proposed device.
Figure 3A:
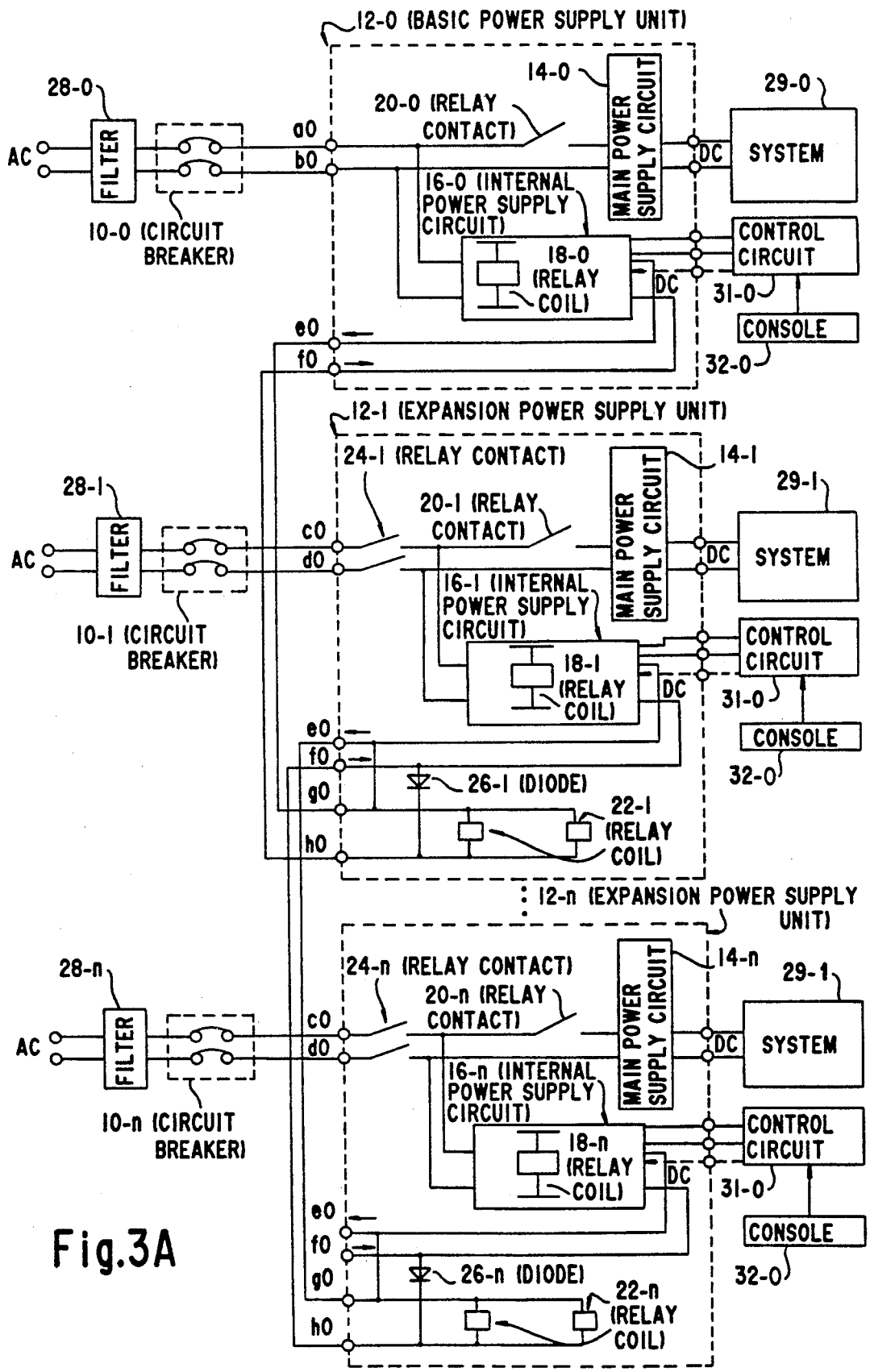
FIG. 3A shows the configuration of a first embodiment of this invention.

FIG. 3A shows the circuit configuration of a first embodiment. The parts with the same numbers as those used in FIG. 1 or FIG. 2 are not re-explained. In FIG. 3A, the expansion power supply units 12-1 through 12-$n$ respectively connect both electric power lines for supplying the direct current outputs from the internal power supply circuits 16-1 through 16-$n$ to the succeeding stage of the externally provided power supply units to the both electric power lines for supplying direct current outputs from the internal power supply circuits 16-0 and 16-1 through 16-$n$-1 of the preceding stages of the externally provided power supply units to emergency cut-off switch driving relay coils 22-1 through 22-$n$ of the present stages.

Then, the diodes 26-1 through 26-$n$ are respectively inserted into one of the paths connecting both electric power lines.

The configuration of this invention is as described above, and the action is as described below.

When the circuit breaker 10-0 closes, the output from the internal power supply circuit 16-0 reaches the emergency cut-off switch driving relay coil 22-1 via a terminal e0 and a terminal g0 of the expansion power supply unit 12-1 and returns via its terminal h0 and a terminal f0 of the basic power supply unit 12-0, thus forming a magnetic excitation loop.

This is similar for the outputs from the internal power supply circuits 16-1 through 16-$n$. Thus, a device per this invention acts similarly to the proposed device, which was previously described.

To be more specific, since the diodes 26-1 through 26-$n$ are provided on the output side of the internal power supply circuits 16-0 and 16-1 through 16-$n$, no current flows among the internal power supply circuits 16-0 and 16-1 through 16-$n$.

Here, when the circuit breaker 10-1 of the expansion power supply unit 12-1 is opened, a loop for relay coil magnetic excitation is formed from the internal power supply circuit 16-0 of the basic power supply unit 12-0 to the terminal e0, the terminal g0 of the expansion power supply unit 12-1, its terminal e0 and the terminal g0 of the succeeding stage, and thence from the terminal h0, via the terminal f0 of the expansion power supply unit 12-1, the diode 26-1, the terminal h0 and the terminal f0 of the basic power supply unit 12-0, back to its internal power supply circuit 16-0.

That is, even after the circuit breaker 10-1 is opened and the expansion power supply unit 12-1 ceases to operate, a direct current electric power is supplied from the power supply unit 12-0 in the preceding stage to the succeeding stage of the power supply unit 12-1. As such, the succeeding stage of the power supply unit 12-1 through the power supply unit 12-$n$ externally provided at the tail end operate "as is".

Thus, while the system continues operating, it becomes possible to cease only the operation of the expansion power supply unit 12-1, so that only the expansion power supply unit 12-1 is subjected to a maintenance or inspection operation.

This is similar, when any of the circuit breakers 10-1 through 10-n is opened.

When the circuit breaker 10-0 is opened, since all of the relay contacts 24-1 through 24-n are opened, the electric power supplies to the expansion units and the original unit of the system are all cut off, and the operation of the entire system ceases.

Figure 3B:
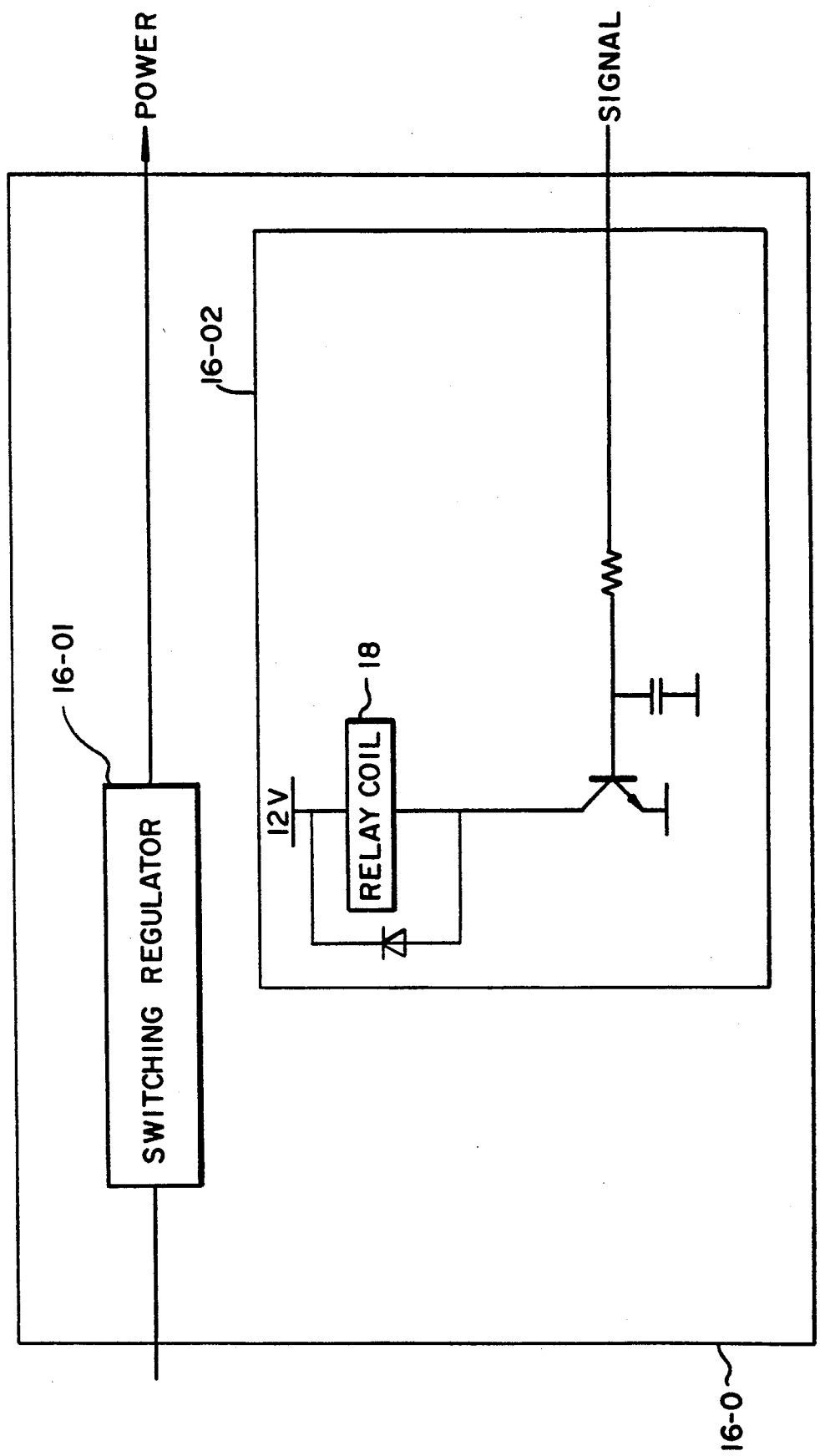
FIG. 3B shows a block diagram of components of the first embodiment.

FIG. 3B shows a circuit of the internal power source circuit 16-0 which comprises a switching regulator 16-01 and a relay coil circuit 16-02. The switching regulator 16-01 receives an AC current from terminals aO and dO of basic power supply 12-0 and supplies a DC power to a control logic circuit 31-0 and to terminals eO and fO. The relay coil circuit 16-02 receives an on/off signal from the control circuit 31-0 so that a relay coil 18-0 is energized upon receipt of the on signal.

Figure 3C:
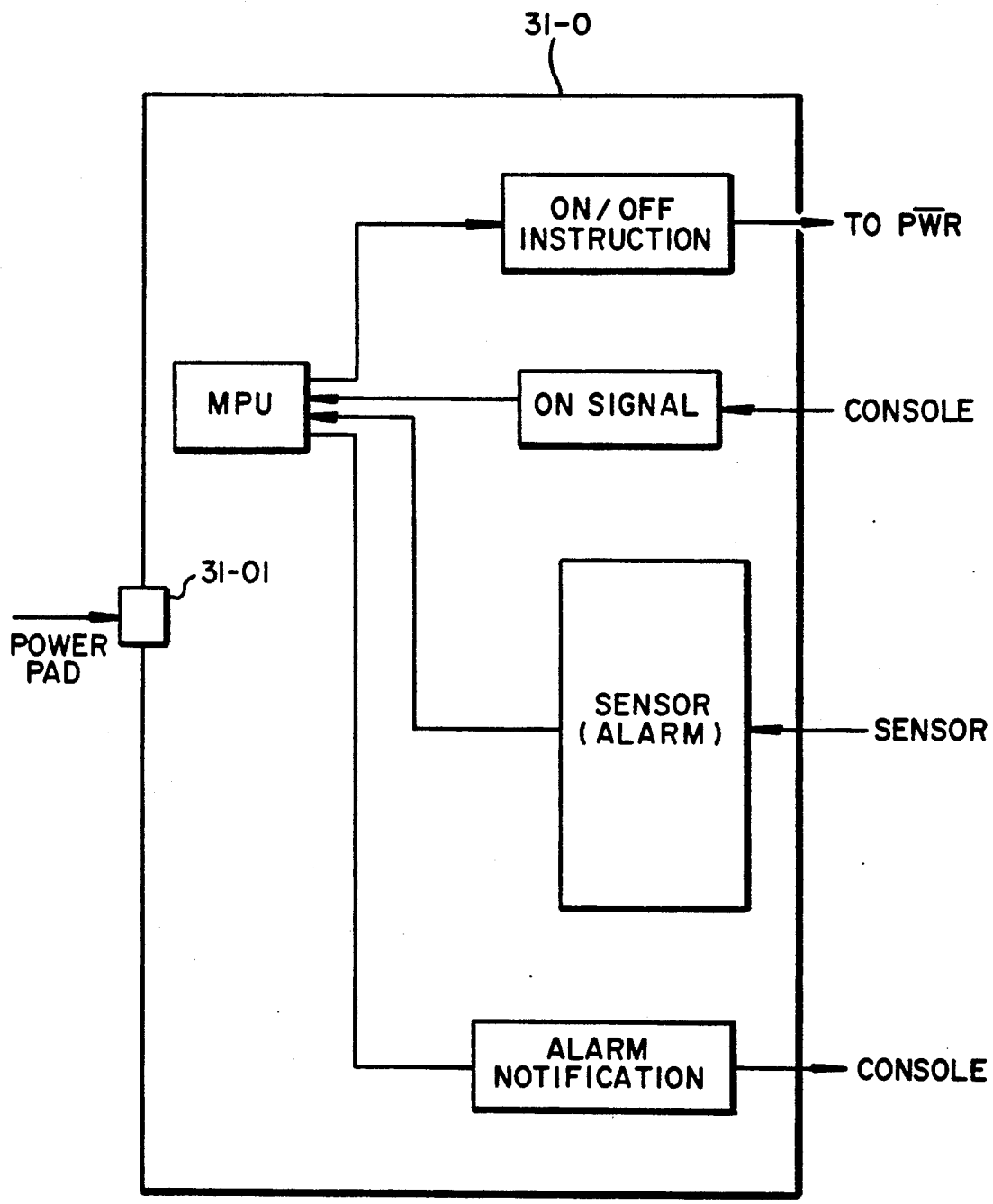
FIG. 3C shows a block diagram of components of the first embodiment.

FIG. 3C shows a block diagram of a control circuit 31-0 which receives a power from the switching regulator 16-01 through power pad 31-01 and also receives an on/off signal from console 32-0 and alarm signals from sensors. The control circuit 31-0 notifies the console 32-0 of the alarm and transmits the on/off instruction to the relay circuit 16-02 of the internal power supply unit 16-0.

Although this embodiment uses relays, semiconductor switches can be used to embody this invention.

As explained above, by providing the diodes 26-1 through 26-n respectively in the expansion power supply units 12-1 through 12-n, it becomes possible to cut off power supplies to a desired system expansion unit, thereby enabling maintenance and inspection to be performed for the expansion units.

As explained above, a device per this embodiment allows maintenance or inspection to be performed only for the desired expansion power supply unit, while the system operation continues for the rest.

This enables non-stop system operation, which is extremely preferable for tasks in which interruptions are to be avoided.

Figure 4:
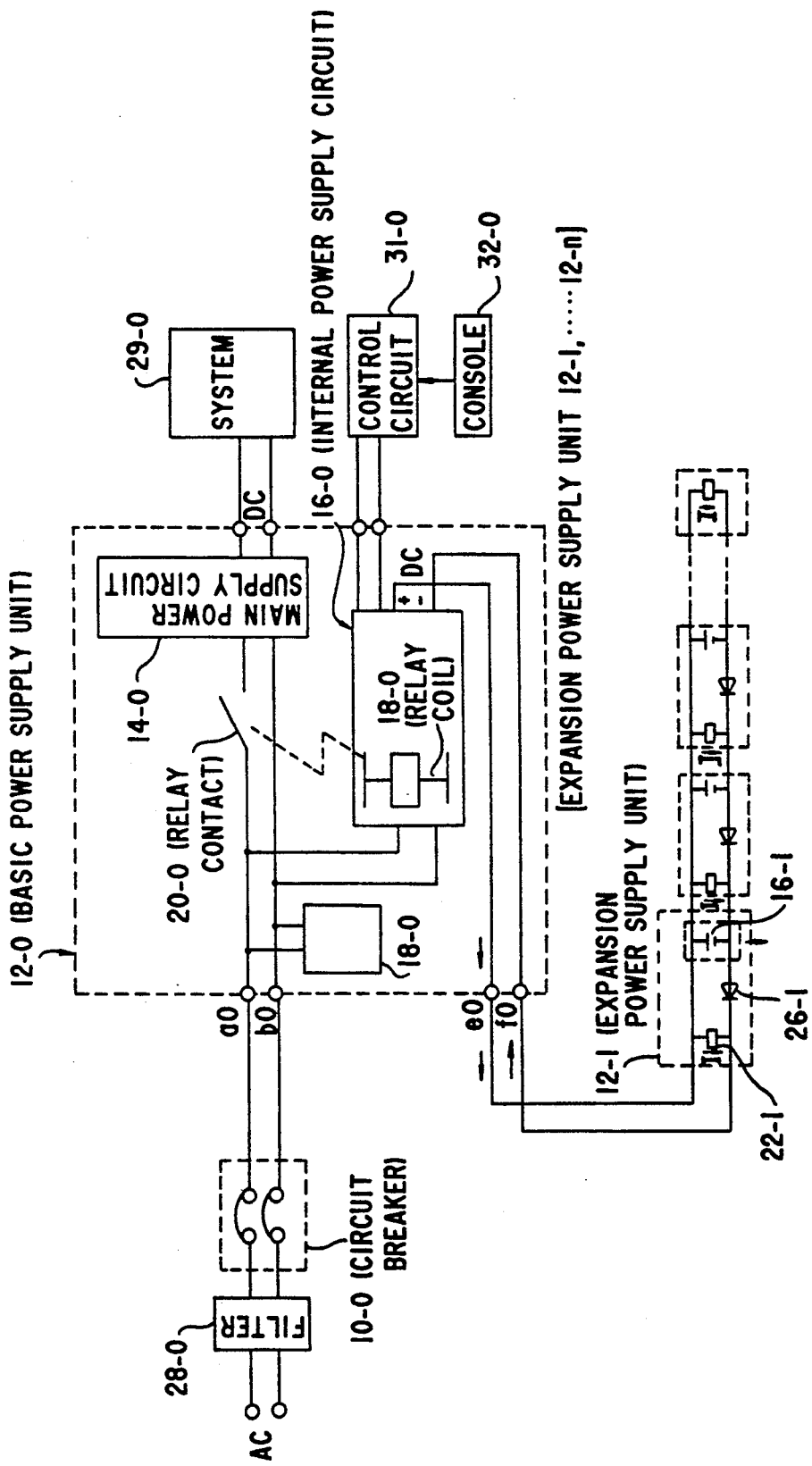
FIG. 4 shows the configuration of a circuit equivalent in principle to the first embodiment of this invention.

FIG. 4 shows the configuration of a circuit equivalent in principle to the first embodiment of this invention. As is apparent, the first embodiment, if the mainline switch of the basic power supply unit is turned ON with the mainline switches of the expansion power supply units being ON, since the internal power supply circuit 16-0 of the basic power supply unit 12-0 supplies power to all the internal power supply circuits 16-1 through 16-n of the expansion power supply units 12-1 through 12-n, a problem arises that the system cannot be booted up normally, because the basic power supply unit 16-0 has a capacity limit.

A second embodiment of this invention offers a solution to such a problem through a modification to the first embodiment.

Figure 5:
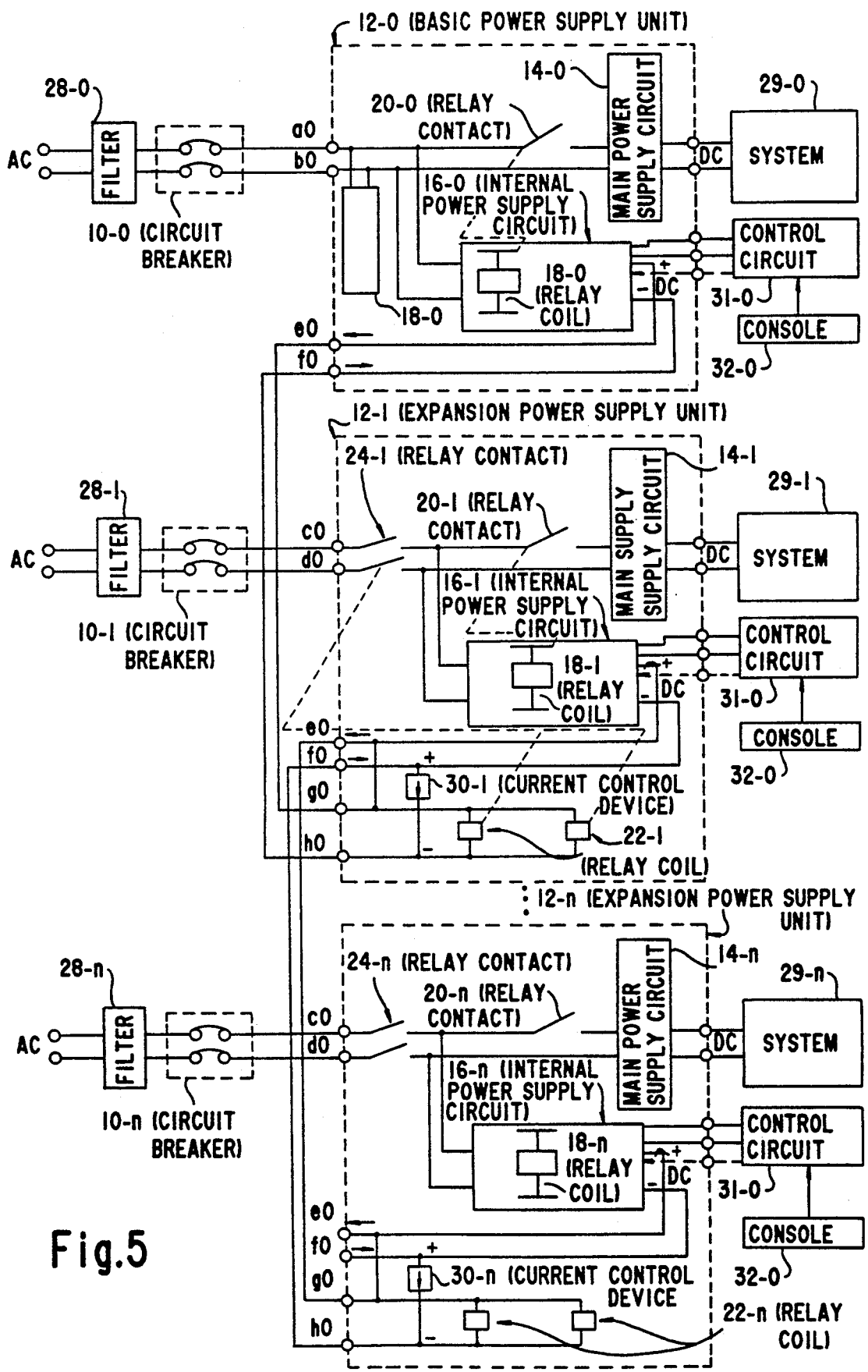
FIG. 5 shows the configuration of a second embodiment of this invention.
Figure 6:
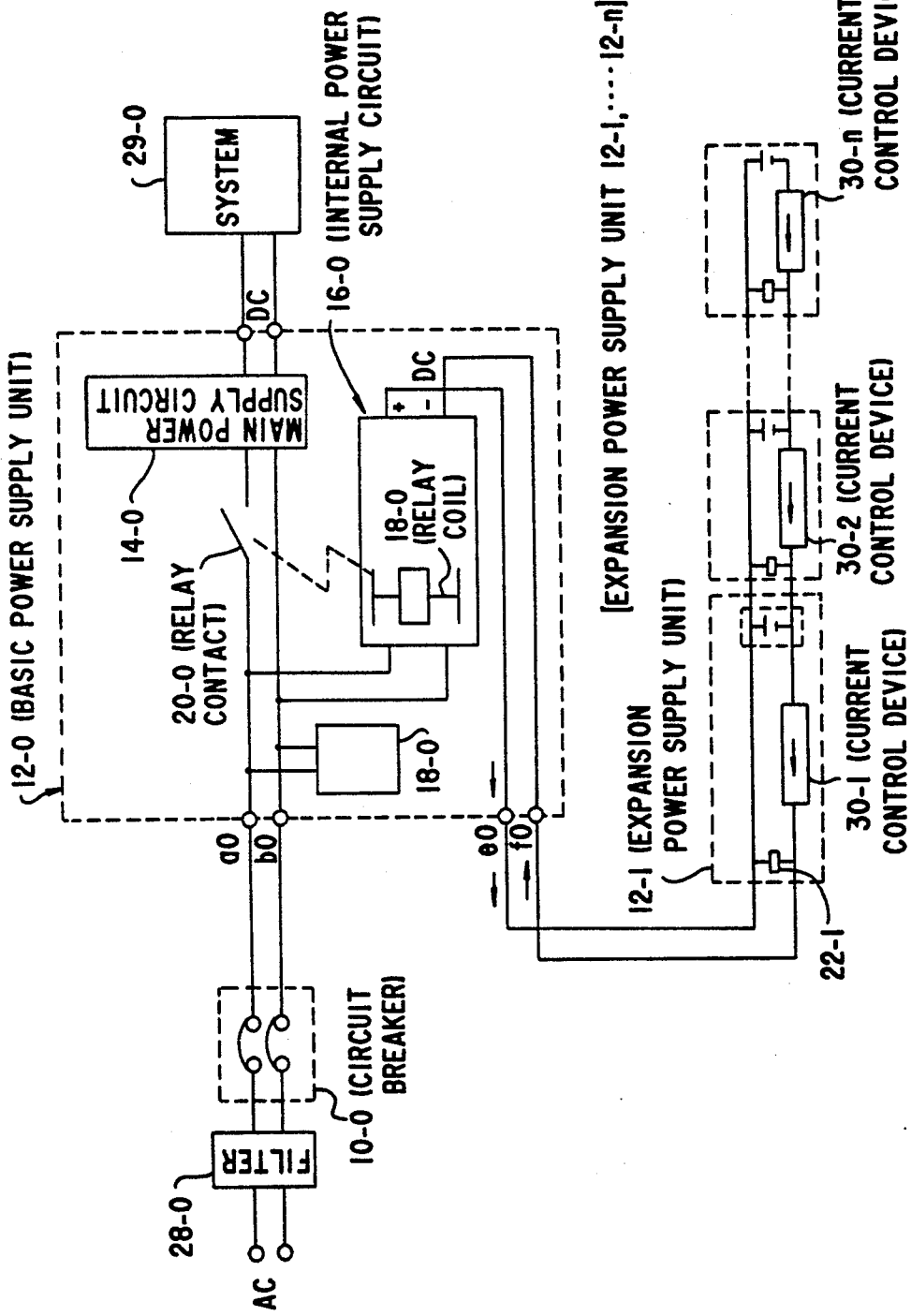
FIG. 6 shows the configuration of a circuit equivalent in principle to the second embodiment of this invention.
Figure 7:
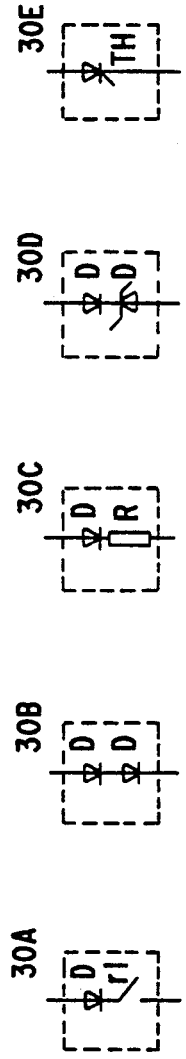
FIGS. 7a–7e show an example of current control devices.

FIG. 5 shows the configuration of the second embodiment of this invention. FIG. 6 shows the configuration of a circuit equivalent in principle to the second embodiment of this invention.

As is evident, the configuration of the second embodiment replaces the diodes 26-1 through 26-n with the current control devices 30-1 through 30-n. The parts which are the same as those in the first embodiment are not explained, again.

The current control devices 30-1 through 30-n have forward characteristics of a diode and a current limiting or circuit opening function, and are configured by combinations of a diode and another element, by diodes or by a thyristor. FIGS. 7a-7e shows an example of such current control devices.

In FIGS. 7a-7e a current control device 30A comprises a diode and a relay contact r1 connected in series, and acts to close the relay contact r1 after a delay (a time period since the relay contact 24-1 begins operating until the internal power supply circuit of the internal power supply circuit 16-1 of the expansion power supply unit 12-1 makes an output), between the time when the internal power supply circuit 16-0 of the basic power unit 12-0 rise and the internal power supply circuit 16-1 of the expansion power unit 12-1 rise.

A current control device 30B comprises diodes connected in multiple stages, supplies power to the expansion power supply unit 12-x to which the internal power supply circuit 16-0 can supply power within its own limit capacity, and prevents a current from flowing in the emergency cut-off switch driving relay circuits 21-(x+1) through 21-n of the expansion power supply units 12-(x+1) through 12-n. By connecting diodes in multiple stages, the emergency cut-off switch driving relay circuits 21-1 through 21-n of the expansion power supply units 12-1 through 12-n are controlled, so that VF of the diodes allow connections of only the ones among the emergency cut-off switch driving relay circuits up to 21-x that do not cause the internal power supply circuit 16-0 to experience a capacity overflow.

A current control device 30C comprises a diode and a resistor R connected in series, and operates similarly to the current control device 30B. When expansion power supply units are added, as more Rs are added, the emergency cut-off switch driving relay circuits 21-1 through 21-n of the expansion power supply units 12-1 through 12-n are controlled, so that voltage is held to a level that triggers the connections of only the ones among the emergency cut-off switch driving relay circuits up to 21-x that do not cause the internal power supply circuit 16-0 to experience a capacity overflow. However, since a resistor is used, there is a loss.

A current control device 30D comprises a diode connected in series with a zener diode, and operates similarly to the current control device 30C. However, since a zener diode must limit the amperage, this is not good for working with a large current.

A current control device 30E comprises a thyristor, which is energized with a lag after the basic power supply unit 16-0 boots up and before the expansion power supply unit 16-1 boots up, as with the current control device 30A.

The current control devices 30B, 30C and 30D need to satisfy the following conditions, because, when one of the mainline switches for the expansion power supply units 12-1 through 12-(n-1) are turned off for maintenance or inspection, the emergency cut-off switch driving relay circuits 22-2 through 22-n of the expansion power supply units 12-2 through 12-n in the succeeding stage must be applied with a voltage over the relay reset voltage.

The diode VF of the current control device 30B:

VF X n ≦ (output voltage from the internal power supply circuits 16-1 through 16-n)−(relay reset voltage)

The resistance drop VR of the current control device 30C:

VR ≦ (output voltage from the internal power supply circuits 16-1 through 16-n)−(relay reset voltage)

The zener diode VZ of the current control device 30D:

VZ ≦ (output voltage from the internal power supply circuits 16-1 through 16-$n$)−(relay reset voltage).

Figure 8:
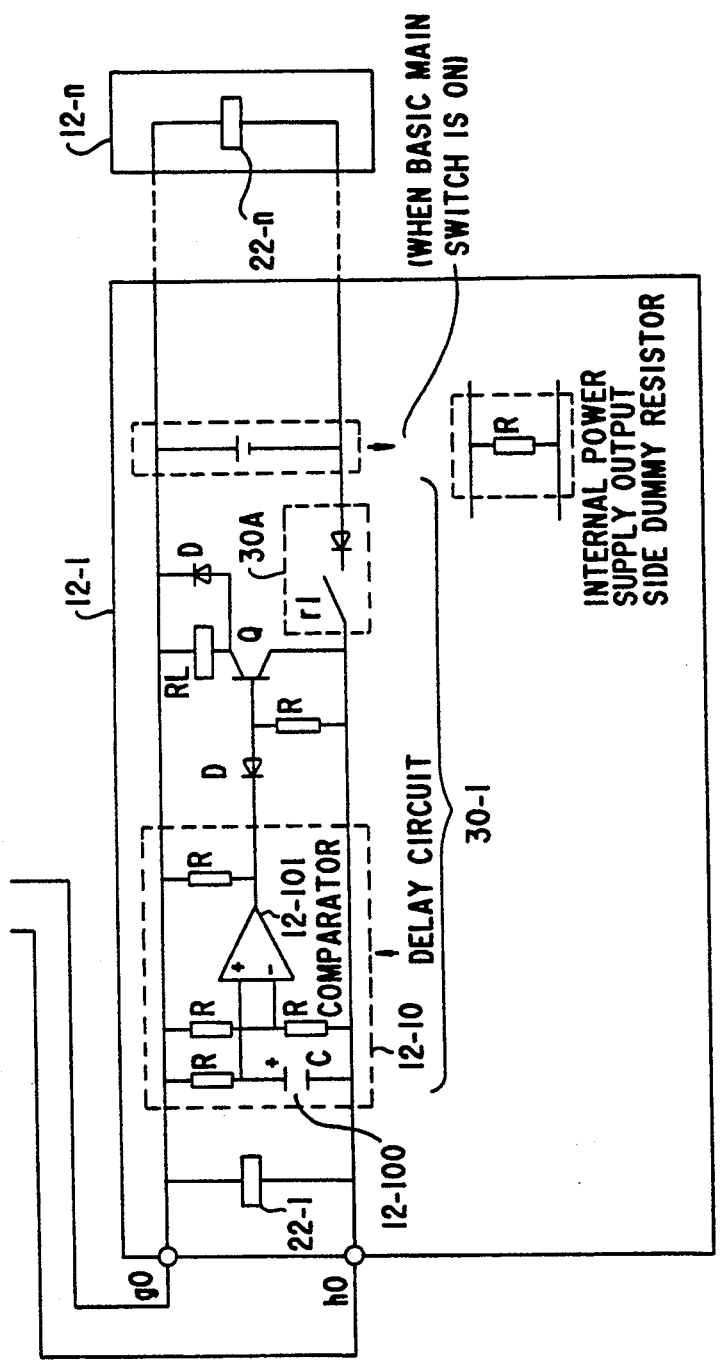
FIG. 8 shows a circuit of expansion power supply units in the second embodiment shown in FIG. 5.

FIG. 8 shows a detailed circuit of the expansion power supply 12-1. A delay circuit 12-10 comprising capacitor 12-100 and comparator 12-101 is provided in current control circuit 30-1. The delay circuit 12-0 prevents a relay contact r1 of relay RL from closing during a period from a rise of the basic power supply unit 12-0 to a rise of the power supply of the expansion power supply unit 12-1.

Figure 9:
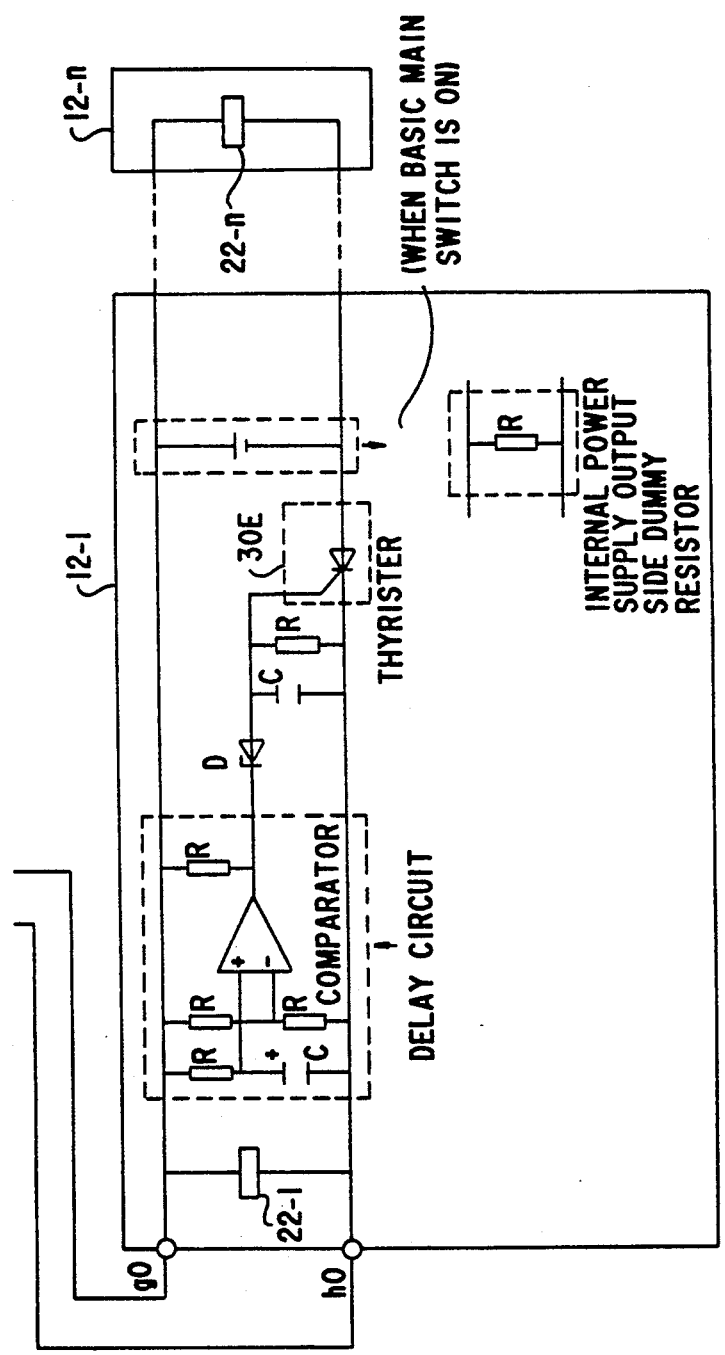
FIG. 9 designates another circuit of expansion power supply units in the second embodiment shown in FIG. 5.

FIG. 9 shows another detailed circuit of the expansion power supply unit 12-1. The delay circuit 12-0 prevents a thyristor 30E turning on during a period from a rise of the basic power supply unit 12-0 to a rise of the power supply of the expansion power supply unit 12-1.

As shown in FIG. 6, which illustrates the circuit equivalent to that drawn in FIG. 5, the second embodiment uses a configuration comprising any one of the current control devices 30A through 30E, which prevents the internal power supply circuit 16-0 of the basic power supply unit 12-0 from having a capacity overflow when the mainline switch of the basic power supply unit 12-0 is turned ON.

Capable of cutting off the power supply in an emergency situation, the circuit of the second embodiment operates normally even when expansion power supply units are added with no limitation, which is realized without having to increase the capacity of the internal power supply circuit 16-0 of the basic power supply unit 12-0.

What is claimed is:

1. A power supply device comprising:
an emergency power cut-off switch;
a basic power supply unit supplied with an external alternating current electric power through said emergency power cut-off switch; and
a plurality of expansion power supply units supplied respectively with external alternating current electric power through power supply switches and said plurality of expansion power supply units provided sequentially and externally to said basic power supply unit;
said basic power supply unit including
a first main power supply circuit for converting said external alternating current electric power supplied through said emergency power supply cut-off switch into a direct current electric power and outputting said direct current electric power;
a first internal power supply circuit for converting said external alternating current electric power supplied through said emergency power supply cut-off switch into a direct current electric power and outputting said direct current electric power to one of the plurality of expansion power supply units, through first and second lines, externally provided at a head end;
a first switch driving circuit supplied with power from said internal power supply circuit; and
a first switch driven to close by the magnetic excitation of said first switch driving circuit connected to an alternating current input of said main power supply circuit; and
said expansion power supply units including
second main power supply circuits for converting external alternating current electric power supplied through said power supply switches into direct current electric power and outputting said direct current electric power;
second internal power supply circuits for converting external alternating current electric power supplied through said power supply switches into direct current electric power and outputting said direct current electric power to the expansion power supply units, through third and fourth lines, provided externally in the succeeding stage;
second switch driving circuits supplied with electric power from said internal power supply circuits;
second switches driven to close by said second switch driving circuits and connected to the alternating current inputs of main power supply circuits;
emergency cut-off switch driving circuits magnetically excited by the direct current outputs supplied from said power supply units in the preceding stages of the externally provided expansion power supply units through said third and fourth lines and through said first second lines for the expansion power supply unit at the head end;
emergency cut-off switches connected to the alternating current inputs of said second switches and said internal power supply circuits and driven to close by said emergency cut-off switch driving circuits;
means for connecting said emergency cut-off switch driving circuit of a present stage to said third line of said present stage; and
diodes connecting said emergency cut-off switch driving circuit which is supplied with direct current outputs from said power supply units in the preceding stages of the externally provided expansion power supply units to said fourth line of said present stage for supplying direct current outputs to said power supply units in the next stages of the externally provided expansion power supply units.

2. A power supply device comprising:
an emergency power cut-off switch;
a basic power supply unit supplied with an external alternating current electric power through said emergency power cut-off switch; and
a plurality of expansion power supply units supplied respectively with external alternating current electric power through power supply switches and said plurality of expansion power supply units provided sequentially and externally to said basic power supply unit;
said basic power supply unit including
a first main power supply circuit for converting said external alternating current electric power supplied through said emergency power supply cut-off switch into a direct current electric power and outputting said direct current electric power;
a first internal power supply circuit for converting said external alternating current electric power supplied through said emergency power supply cut-off switch into a direct current electric power and outputting said direct current electric power to one of the plurality of expansion power supply units, through first and second lines, externally provided at a head end;
a first switch driving circuit supplied with power from said internal power supply circuit; and
a first switch driven to close by the magnetic excitation of said first switch driving circuit connected to an alternating current input of said main power supply circuit; and said expansion power supply units including second main power supply circuits for converting external alternating current electric power supplied through said power supply switches into direct current electric power and outputting said direct current electric power;

second internal power supply circuits for converting external alternating current electric power supplied through said power supply switches into direct current electric power and outputting said direct current electric power to the expansion power supply units, through third and fourth lines, provided externally in the succeeding stage;

second switch driving circuits supplied with electric power from said internal power supply circuits;

second switches driven to close by said second switch driving circuits and connected to the alternating current inputs of main power supply circuits;

emergency cut-off switch driving circuits magnetically excited by the direct current outputs supplied from said power supply units in the preceding stages of the externally provided expansion power supply units through said third and fourth lines and through said first and second lines for the expansion power supply unit at the head end;

emergency cut-off switches connected to the alternating current inputs of said second switches and said internal power supply circuits and driven to close by said emergency cut-off switch driving circuits;

means for connecting said emergency cut-off switch driving circuit of a present stage to said third line of said present stage; and current control means for connecting said emergency cut-off switch driving circuit which is supplied with direct current outputs from said power supply units in the preceding stages of the externally provided expansion power supply units to said fourth line of said present stage for supplying direct current outputs to said power supply units in the next stages of the externally provided expansion power supply units.

3. The power supply device according to claim 2 wherein said current control means comprises a diode and a relay contact connected to said diode.

4. The power supply device according to claim 3 wherein said current control means further comprises a delay circuit for preventing said relay contact from closing during a period from a rise of the basic power unit to a rise of a power supply of the expansion power supply unit.

5. The power supply device according to claim 2 wherein said current control means comprises a thyristor.

6. The power supply device according to claim 5 wherein said current control means further comprises a delay circuit for preventing said thyristor from conducting during a period from a rise of the basic power unit to a rise of a power supply of the expansion power supply unit.

7. The power supply device according to claim 2 wherein said current control means comprises serially connected diodes.

8. The power supply device according to claim 2 wherein said current control means comprises a diode and a resistor connected to said diode.

9. The power supply device according to claim 2 wherein said current control means comprises a diode and a zener diode connected to said diode.

* * * * *